Aug. 12, 1941.     L. A. BIXBY     2,252,158
GEAR SHIFTING MECHANISM
Filed Nov. 8, 1937     4 Sheets-Sheet 1
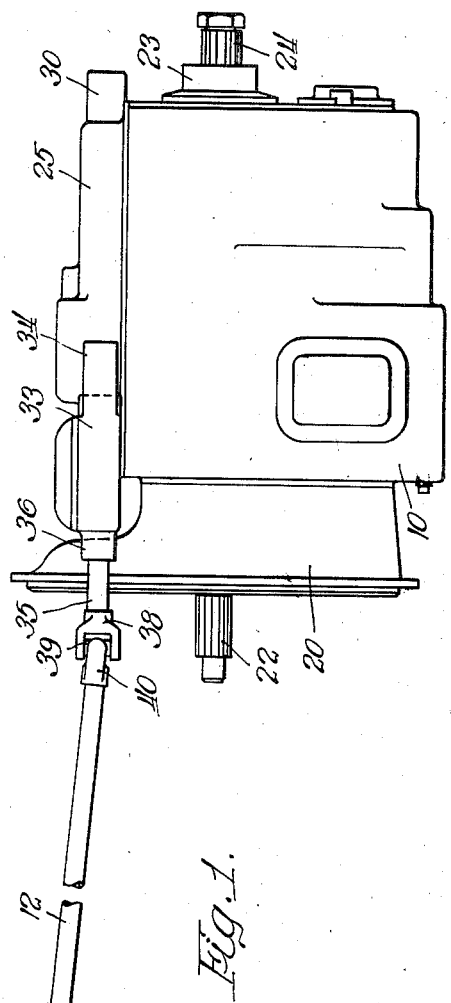
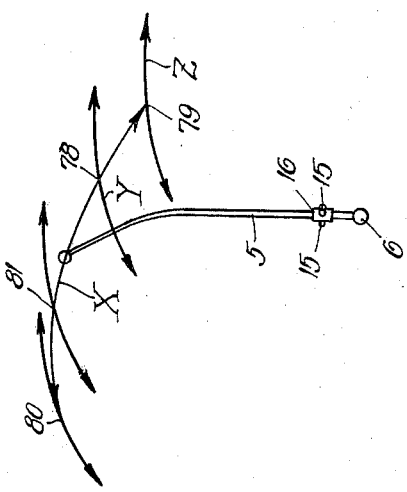
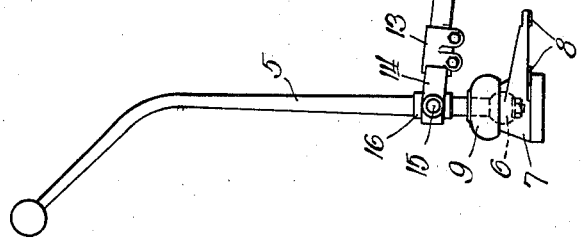
Inventor:
Leo A. Bixby
By Walter E. Schismer
Atty.

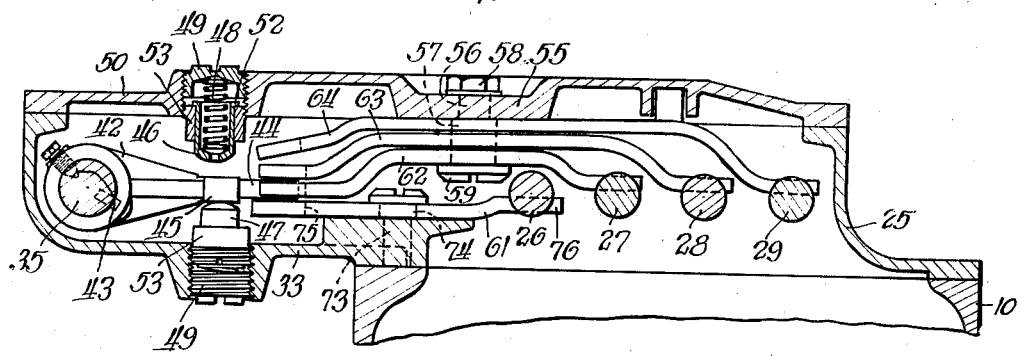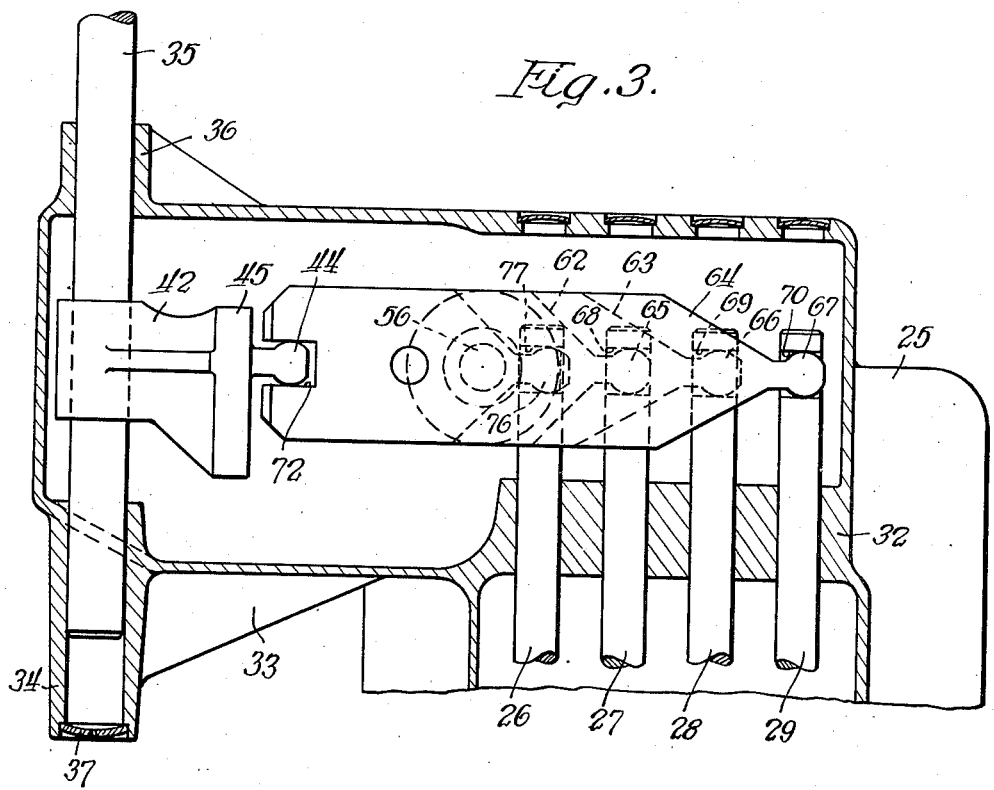

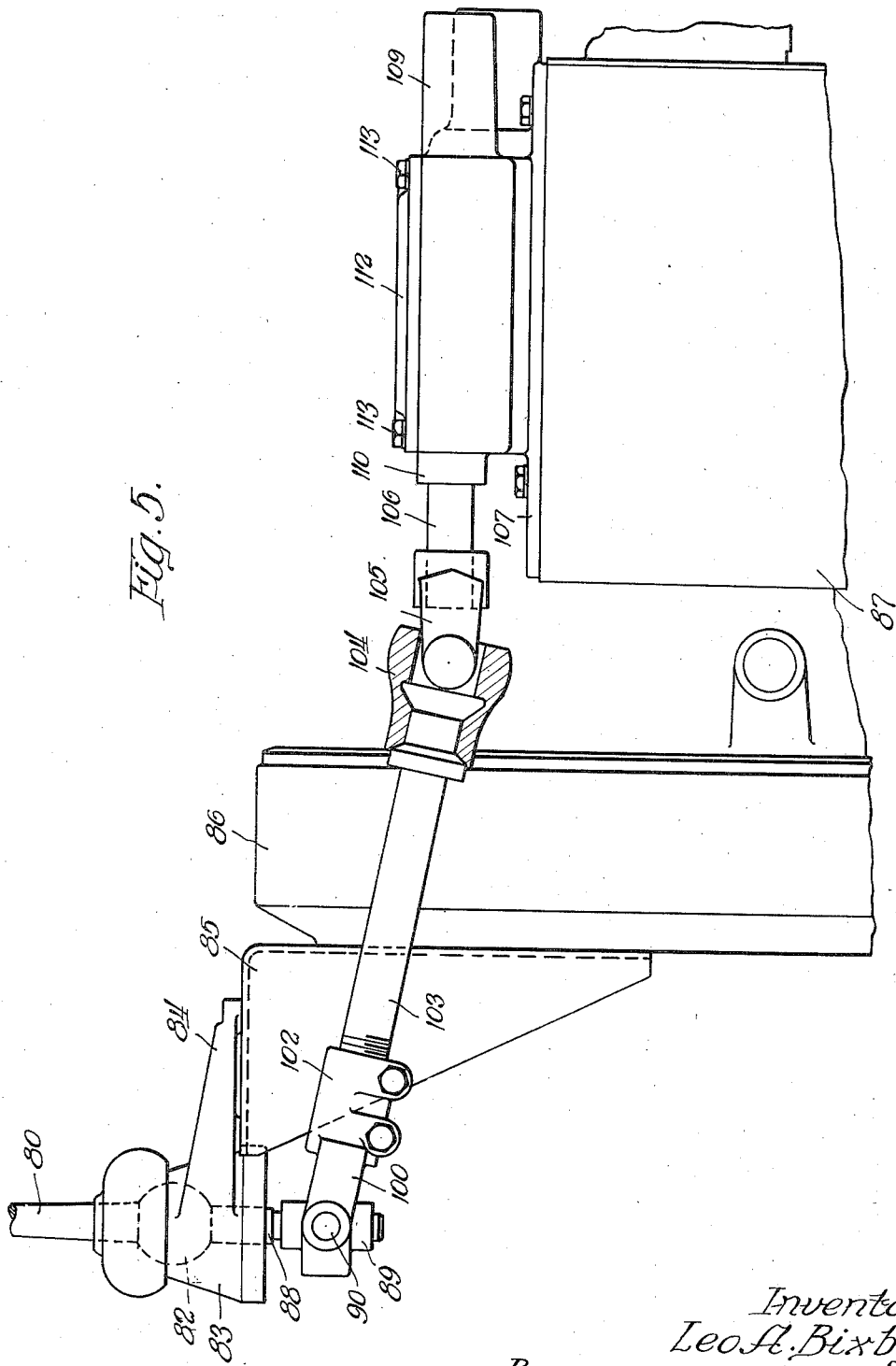

Aug. 12, 1941.　　　L. A. BIXBY　　　2,252,158
GEAR SHIFTING MECHANISM
Filed Nov. 8, 1937　　　4 Sheets-Sheet 4
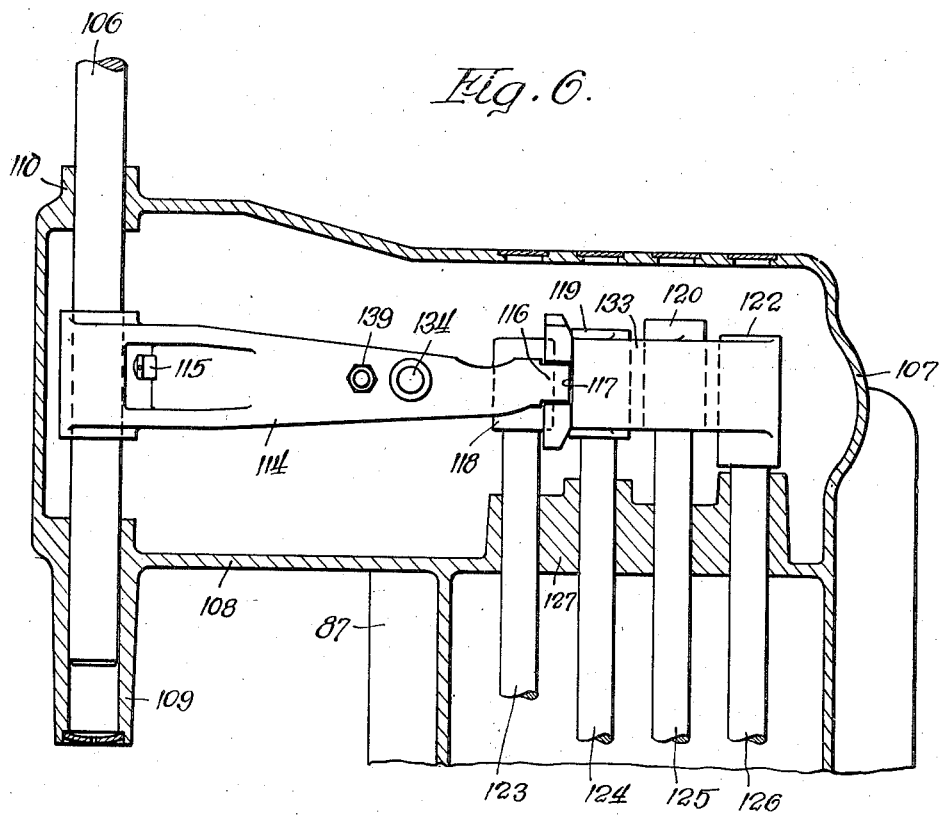
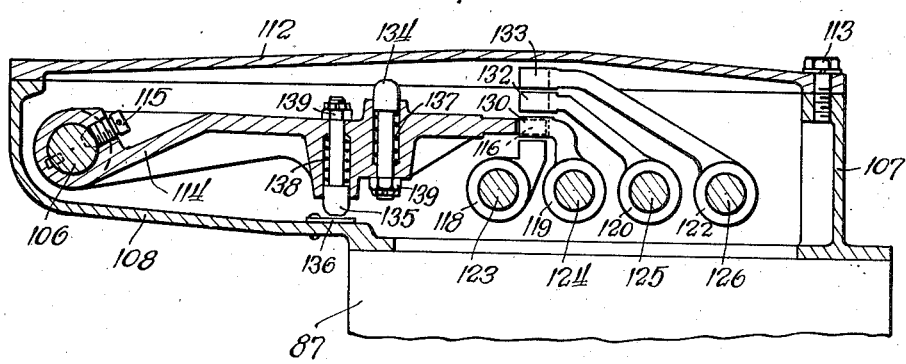
Inventor:
Leo A. Bixby.
By Walter E. Schirmer
Atty.

Patented Aug. 12, 1941

2,252,158

UNITED STATES PATENT OFFICE 2,252,158

GEAR SHIFTING MECHANISM

Leo A. Bixby, Kalamazoo, Mich., assignor to Clark Equipment Company, Buchanan, Mich., a corporation of Michigan Application November 8, 1937, Serial No. 173,392

4 Claims. (Cl. 74—473)

This invention relates to gear shifting mechanism, and more particularly is directed to gear shifting mechanism of the type in which a remotely disposed transmission may be controlled and shifted through its various change speed ratios from a gear shift lever disposed in the driver's cab.

With the recent advent of trucks and other vehicles in which the driver's compartment is mounted over the engine at the forward portion of the vehicle and the transmission is mounted adjacent the rear of the vehicle or at a point removed from the driver's compartment, it has become necessary to devise some means whereby the driver can transmit the motions desired for effecting change of speeds in the transmission thereto from his compartment.

It is desirable that the transmission of this motion be so effected that the normal shifting movements heretofore required for various speed changes be retained in order that the operator does not have to learn a new sequence of movements and new shifting habits. For this reason the design of the mechanism should be such that the transverse and lateral movements for effecting shifting which are produced by the driver at the gear shift lever should be so transmitted to the shifting mechanism at the transmission to insure the corresponding speed-change desired by the driver.

It is therefore a primary object of the present invention to provide means for effecting transmission of shifting movement and selection of the desired speed changes at the transmission without requiring any variation from the standard shifting practice heretofore employed.

Also, I have found that it is desirable to reduce, as much as possible, the overall height of the transmission housing in order that it may be disposed in the confines of the chassis without requiring any projecting portions that might interfere with other parts of the vehicle construction. Ordinarily, such transmissions are provided with a bell-shaped housing which is piloted into the fly wheel housing of the engine, or is otherwise suitably coupled to the prime mover.

It is an object of the present invention to provide a gear selection and shifting mechanism at the transmission which will be disposed within the peripheral limits of such a bell flange, and which will have no projecting portions that might produce interference or require changes in other portions of the vehicle construction.

To carry out this feature of the invention I provide what may be termed a "flat top" gear selecting and shifting housing mounted on the transmission. This housing is of no appreciable height, and yet contains all of the mechanism necessary to effect both selection of the desired shifter fork in the transmission and to produce shifting movement of such fork in the desired direction.

Preferably, in the preferred embodiment of the present invention, this selection mechanism comprises an operating or control shaft extending longitudinally adjacent the top of the transmission and carrying thereon, a normally extending arm which is keyed to the shaft for rotation therewith. The amount of rotation of the arm required to effect the desired selection of the shifting fork is extremely limited, and the forks themselves are provided with suitable yokes so designed as to lie within a limited vertical extent. Thus, the entire shifting movement is produced by rocking of this shaft into position to engage the desired shifter fork and subsequent longitudinal movement of the shaft to effect corresponding longitudinal movement of the shifting fork. The required movement of this operating or control shaft is produced by means of motion transmitting mechanism connected to the standard type of gear shift, and is operated in the desired manner with standard movements of the gear shift lever so that no alteration or revision of the shifting movement is required in order to effect the desired gear ratio selection at the transmission.

Another feature of the present invention is the provision of a very compact and easily assembled gear selecting housing mounted on the top of the transmission case, and occupying little or no additional vertical space. In addition, the housing is so designed that the mechanism therein is readily accessible for inspection, replacement or repair without requiring any dismantling of the transmission mechanism itself or the disassembly of any of the gear shifting mechanism.

Another feature of the present invention is the provision of a suitable selecting mechanism which is so arranged that when the motion transmitting mechanism is connected to the gear shift lever in such manner that the motion transmitted is the reverse of the shifting motion desired, a second reversal of the transmitted motion is effected within the selecting housing so that the final movement of the selected shifter fork is in accordance with the normal movement of the gear shift lever. This is provided by means of pivoted shifting arms fulcrumed within the selecting housing and engageable at one end by the selecting arm of the control shaft, and at the opposite end engaging the shifter forks for effecting shifting movement upon longitudinal movement of the control shaft.

Other objects and advantages of the present invention will appear more fully from the following detailed description which, taken in conjunction with the accompanying drawings, will disclose to those skilled in the art the particular construction and operation of a preferred form of the present invention.

In the drawings:

Figure 1 is an elevational view illustrating one form of the present invention;

Figure 2 is a diagrammatic view illustrating the movement of the gear shift lever to effect the desired speed selection;

Figure 3 is a top plan view, with the cover removed, of the selecting mechanism controlled by the shifting means shown in Figure 1;

Figure 4 is a sectional view taken through the selecting mechanism shown in Figure 3;

Figure 5 is a view corresponding to Figure 1 of a modified form of shifting mechanism;

Figure 6 is a top plan view of the selecting mechanism shown in Figure 5; and

Figure 7 is a sectional view corresponding to Figure 4 of the modified construction shown in Figure 5.

Referring now in detail to the embodiment of the invention shown in Figures 1, 3 and 4, I provide a gear shift lever 5 having a ball portion 6 mounted for universal movement in a supporting bracket 7 which may be suitably secured to any supporting base by means of securing means passing through the extensions 8. Preferably, sealing means 9 is provided above the ball and socket connection and encloses the same to retain lubricant therein in the usual manner.

This shift lever 5 may be mounted in the cab of a cab-over-engine type truck, or in any position convenient to the operator of the vehicle, and the shifting movement imparted thereto by the operator is transmitted to a transmission mechanism enclosed within the housing 10. This movement is transmitted by means of the coupling shaft 12, which at one end is provided with a yoke portion 13 having suitable arms 14 pivotally secured to studs 15 mounted upon a collar 16 fixedly secured to the lever 5 above the ball and socket connection 6. It will thus be apparent that upon lateral swinging movement of the lever 5 in the direction indicated by the line X in Figure 2, the rod 12 will be rotated at the same time that it is moving bodily with the lever 5 due to the angular displacement of the arms 14 by reason of the angular shifting of the rod 5 about the ball 6 as a center.

The transmission housing is provided at its forward end with the bell-shaped flange portion 20 which is adapted to be piloted into the rear end of a clutch housing or any other suitable support, and has the forwardly extending splined shaft 22 which is adapted to be coupled to the power unit in any suitable manner and through any suitable clutching mechanism. The housing 20 has a suitable journal cap member 23 through which the driven shaft 24 extends for connection to the power transmitting drive for the vehicle wheels. The upper portion of the transmission housing above the change speed gearing mechanism is substantially flat on the top, and is adapted to receive a secondary housing member 25 of substantially limited vertical height, which housing member 25 is adapted to contain the longitudinally movable shift rods 26, 27, 28 and 29. These rods are suitably supported at one end in the extension 30 of the housing 25, and at their opposite end are suitably journalled in the forward portion of the housing 25 as indicated at 32.

The forward portion of the housing 25 is provided with a lateral extension 33 which has a suitable journal portion 34 for supporting one end of a control shaft 35, the opposite end of which projects through the journal portion 36 of the extension forwardly toward the gear shift lever 5. The shaft 35 is mounted for longitudinal movement in the journals 34 and 36. The journal 34 is closed at its outer end by spring disc 37 in any well known manner.

The projecting end of the shaft 35 is provided with a suitable yoke arm 38 which is adapted to be coupled through the intermediate member 39 to a yoke arm 40 carried by the adjacent end of the control rod 12. The connection between the shaft 35 and rod 12 provides for transmitting rotative movement of the rod 12 to the shaft 35 regardless of the angularity of the rod 12 with respect to the axis of the shaft 35 due to the universal joint connection therebetween provided by the arms 38 and 40. Thus, rotative movement imparted to the rod 12 by movement of the lever 5 along the line X of Figure 2 imparts limited rotative movement in a corresponding direction to the shaft 35 within the journals 34 and 36.

Mounted on the shaft 35 within the extension 33 of the housing 25 is an arm 42 which is suitably keyed for conjoint rotation with the shaft 35 by means of the locking key 43. The arm 42 normally extends at right angles to the axis of the shaft 35 and transversely through the extension 33 terminating at its end in a selecting knob 44 as shown more in detail in Figure 3. Intermediate the ends of the arm 42, the arm is provided with oppositely flattened portions 45 which are adapted to have bearing engagement against the bumper members 46 and 47. The members 46 and 47 comprise cylindrical sleeves having rounded ends adapted to engage the flatted portions 45 of the arm 42, and normally urged outwardly against the arm by means of springs 48 biased within the bumpers 47 and 46, and at their opposite end biased against a closure cap 49 threaded into suitable bosses formed in the extension 33 and in a top cap member 50 which is secured in any suitable manner to the upper flange face of the housing 25 and extension 33. The bumpers are limited in movement toward the arm 42 by means of flanges 52 formed at the inner ends thereof which engage against suitable guiding and supporting bushings 53.

The cap member 50 is provided adjacent its central portion with a depressed boss 55 which is adapted to receive a suitable stud 56 secured thereto and projecting into the interior of the housing 25. The stud 56 has an enlarged portion 57 forming a shoulder abutting against the inner face of the boss 55 and held thereagainst by means of the nut 58 threaded over the projecting portion of the stud 56. A suitable kerfed head 59 is provided at the inner end of the enlarged portion 57 of the stud, and serves to maintain a plurality of actuating levers 62, 63, and 64 on the stud 56 for rotative movement thereabout. The levers 62, 63 and 64 are pivoted intermediate their ends on the portion 57 of the stud, and adjacent their ends are provided with suitable shifter knobs 65, 66 and 67, respectively, these knobs being bent downwardly and engaging in suitable notched portions 68, 69 and 70 formed in the forward ends of the respective rods 27, 28 and 29. At their opposite ends the arms 62, 63, and 64 are bent downwardly and extended laterally so that the ends thereof lie in an arcuate path of a radius corresponding to the radius of the knob portion 44 of the arm 42. Each of the levers 62, 63 and 64 is provided with a notched portion 72 into which the knob 44 may be moved by rotation of the shaft 35 to position the knob 44 in the notch so that longitudinal movement of the shaft 35 will result in rotational movement of the selected lever about the stud 56 and produce a corresponding reverse movement of the knob 65, 66 or 67 formed at the opposite end of the selected lever. Thus, upon the selection of any one of the levers 62, 63 or 64 by rotation of the arm 42 caused by rotative movement of the shaft 35, the corresponding selected shifter rod may be longitudinally shifted upon longitudinal movement of the shaft 35 in the selected position.

The extension 33 of the housing 25 is provided with a suitable boss portion adapted to receive the stud 73 which is suitably secured therein and which has the portion 74 adapted to form a pivotal support for the shifting lever 61. The lever 61 is also provided at the end adjacent the arm 42 with a notch 75 into which the pivotal knob 44 may be moved upon suitable clockwise rotation of the shaft 35. The opposite end of the arm 61 is provided with a shifter knob 76 which engages in a suitable notch 77 formed in the under side of the shifter rod 26. Thus, when the shaft 35 is rotated to move the shifter knob 44 into the notch 75, longitudinal movement of the shaft 35 will result in rotative movement of the lever 61 and consequently result in a reverse longitudinal shifting movement of the rod 26.

Considering now the operation of the shifting mechanism disclosed in this embodiment of the invention, the lever 5 is first rotated from the neutral position shown in Figure 2 laterally on the socket 6 in a direction indicated by the line X. Rotation of the lever to a position intermediate its neutral position and its final position along the line X results in the arm 42 moving into engagement with the lever 63 when the lever 5 is moved to the junction point indicated at 78 in Figure 2. Forward movement of the lever 5 along the line Y of Figure 2 will result in forward movement of the shaft 35 with respect to the housing 25. This results in rotation of lever 63 in a clockwise direction with respect to stud 56, and consequently results in rearward longitudinal movement of the corresponding shift rod 28. Thus, longitudinal shifting movement of the rod 28 may be controlled by moving the lever 5 sidewise into a position corresponding to the point 78 on the line X, and then moving the lever along the line Y to produce the desired longitudinal shifting of the selected rod 28.

Similarly, if the lever 5 is moved to its limiting position indicated by the junction point 79 on the line X of Figure 2, the arm 42 will be moved into engagement with the notch 72 in the lever 64. This results in placing the gear shift lever 5 in connection with the shifter rod 29 and corresponding movement of the lever 5 along the path Z of Figure 1 will result in a reverse corresponding longitudinal movement of the shifter rod 29.

When the lever 5 is moved to its opposite limiting position indicated at 80 in Figure 2, the arm 42 will be moved into engagement with the notch 75 of the lever 61 and consequently, forward or rearward movement of the lever 5 in this position will result in a reverse longitudinal movement of the shifter rod 26. Movement of the lever to its intermediate position on this side of the neutral position to the junction points 81 will result in engagement of arm 42 with lever 62 to control the longitudinal shifting movement of the shifter rod 27.

It will thus be apparent that the lateral swinging movement of lever 5 along the path marked X in Figure 2 will result in sufficient rotation of shaft 35 in the corresponding direction to rotate the arm 42 into engagement in the notch of the desired shift lever 61, 62, 63 or 64. When the arm has been moved into the selected position, forward or rearward movement of the gear shift lever 5 will result in a corresponding selection of movement of the selected shifter rod controlled by the selected shift lever. It will be apparent that the shifting movement imparted to the lever 5 by the operator with the construction disclosed herein will provide for normal shifting movement of the selected shift rod by a normal shifting action on the lever 5. The operator therefore is not required to learn a new shifting sequence by reason of the present construction, but can continue in the somewhat mechanical shifting manner which is now standard practice, and yet effect the correct shifting movement of the selected shift rod 26, 27, 28 or 29 in the remotely disposed transmission. The bumpers 46 and 47 normally maintain the arm 42 in a neutral position intermediate the levers 62 and 63 so that the shift lever is normally biased toward its neutral position, and the operator is only required to shift it in the desired lateral direction to effect selection of the desired shift lever and to then move it in a rearward direction or a forward direction, depending upon the speed ratio selected to impart the desired shifting movement to the shift rod.

Considering now the embodiment of the invention disclosed in Figures 5 to 7, I have provided a gear shift lever 80 having a ball portion 82 mounted in a suitable bracket 83 to provide for universal support of the lever 80. The bracket 83 is provided with extending arm portions 84 by which the bracket may be secured to a supporting member 85 mounted on the clutch or fly wheel housing 86 of a transmission construction including the transmission housing 87.

In this embodiment of the invention the shift lever 80 is provided with a depending extension 88 below the ball 82, which is adapted to receive a suitable collar 89 having oppositely extending studs 90 to which are secured the arms 100 of a yoke member 102 suitably secured to the adjacent end of a motion transmitting rod 103. The opposite end of the rod 103 is provided with a yoke 104 which, together with the yoke 105, forms a universal joint connection between the rod 103 and a shaft 106.

Mounted on the transmission is an auxiliary housing 107 which is of substantially rectangular form, and which has a laterally offset portion 108 having journals 109 and 110 in which the shaft 106 is mounted for rotational and longitudinal movement. The housing 107 is provided with a flat cover plate 112 which is suitably secured as by means of studs 113 to the upper flanged face of the housing 107, and which encloses the selecting and shifting mechanism.

The shaft 106 is provided in the portion thereof intermediate the journals 110 and 109 with a horizontally extending arm 114 which is keyed thereto for conjoint rotation by means of the set screw 115. The arm 114 at its free end is provided with a shifter knob portion 116 which is adapted to have selected engagement in the forked portion 117 of any one of a plurality of shifter forks 118, 119, 120 or 122 rigidly secured to the respective shifter rods 123, 124, 125 or 126 which extend longitudinally through the housing 107, and are supported adjacent their forward end for longitudinal movement in the boss portion 127 of the housing 107. Each of the shifter rods is adapted for longitudinal shifting movement to effect engagement of the particular gear speed ratio controlled thereby within the transmission housing 87. It will be noted that the fork 118 extends upwardly and to the right hand side of the shifter rod 123, as shown in Figure 7, and the notch thereof opens upwardly for reception of the shifter knob 116 carried by the arm 114. The shifter forks 119, 120 and 122 are provided with respectively superposed laterally extending portions 130, 132 and 133 which are in vertical alignment above the fork 118, and which are adapted to be selectively engaged by the shifter knob 116 upon rotation of shaft 106.

Intermediate its ends the arm 114 is provided with spring pressed bumper members 134 and 135 which extend in opposite directions, the bumper 134 being adapted to engage the under surface of the cover plate 112 for resiliently cushioning the rotative movement of the arm 114 in a counter-clockwise direction, while the bumper 135 engages a suitable wear plate 136 mounted in the base portion of the extension 108 for cushioning clockwise rotation of the arm 114. The two bumpers comprise round headed studs which are normally biased toward their outermost position by springs 137 and 138, respectively, encircling the reduced portion of the shank of the stud and normally holding the nuts 139 against the upper and lower faces of the arm 114, respectively. These two bumpers are so arranged as to normally position the arm 114 in a position intermediate the overhanging notched portions 130 and 132 of the forks 119 and 120, in which position the gear shift lever 80 is in a neutral position.

In the operation of the structure disclosed in this embodiment of the invention, lateral rotation of the gear shift lever 80 about the ball 82 results in a rotation of the motion transmitting rod 103. This limited rotation of the rod 103 is sufficient to impart a selective rotation to the shaft 106 for rotating the arm 114 into engagement with the selected shifter fork. The amount of rotational movement required in the shaft 106 for such selection is extremely limited due to the length of the arm 114 whereby a slight increment of movement of the shaft 106 results in a considerable movement at the end of the arm 114.

When the shift lever 80 has been laterally moved into the desired position for selecting a certain one of the shifter forks within the housing 107 the shift lever 80 is moved in a direction at right angles to its selecting direction about the ball 82, which results in a reversal of this movement as transmitted to the rod 103. Thus, as the lever 80 is pushed rearwardly after being moved sidewise into its selected position, the rod 103 moves forwardly and consequently produces forward longitudinal movement of the shaft 106. This results in a corresponding forward movement of the arm 114 within the housing 108, and results in a corresponding forward shifting movement of the selected shifter fork and consequently a forward longitudinal movement of the associated shifter rod. Similarly, a forward movement of the lever 80 results in a rearward shifting movement of the selected shifter rod. By this arrangement it is therefore apparent that the standard sequence of shifting operations at the gear shift lever will result in reproduction of the required shifting movement at the transmission since the shifter rods in a standard transmission are moved forwardly upon rearward movement of the shift lever and are moved rearwardly upon forward movement of the shift lever. Thus the operator is not required to acquaint himself with any new shifting sequence, but can operate the present mechanism by going through the same shifting movement that he has been accustomed to.

It will be noted that by reason of the present construction the vertical height required for the shifting mechanism is materially reduced, and in no case extends above the vertical extent of the transmission housing and associated bell flange. This is of extreme importance in situations in which only a limited vertical clearance is provided, and by reason of the so-called "flat top" gear shift housing arrangement, it is possible to mount the transmission at any desired point in the chassis and to remotely control the same without in any way interfering with other portions of the vehicle structure. The provision of a control shaft for effecting initial selection of the shifting rod and subsequent longitudinal shifting thereof disposed in a laterally offset position with respect to the shifting mechanism and substantially in the same horizontal plane with the shifter rods results in an appreciable reduction of the vertical height required for the shifting mechanism, and also results in a compact unit which may be readily mounted upon the standard type of transmission, and which has relatively wide inspection opening provided by the cover plate of the auxiliary housing whereby ready inspection, replacement and repair of the mechanism is provided without requiring any dismantling of the transmission itself.

I am aware that certain details of construction of the present invention may be varied considerably without in any way departing from the underlying principles thereof, and I therefore do not intend to limit the invention to the specific embodiments herein illustrated, but only insofar as described by the scope and spirit of the appended claims.

I claim:

1. In combination, a transmission housing having change speed gearing therein, shifter rods mounted for longitudinal shifting movement in the upper portion of said housing and lying in a common horizontal plane, an operating shaft disposed at one side of said housing and in substantially the same horizontal plane as said rods and projecting outwardly of the housing, arm means within the housing extending laterally from and keyed to said shaft and controlled by rotative and longitudinal movement of said shaft for effecting selecting and shifting movement of any one of said shifter rods, and resilient bumper means indicating limiting positions of the selecting movement of said arm means relative to said housing.

2. In combination, a transmission housing having change speed gearing therein, a substantially rectangular housing of relatively small height secured to said transmission housing and enclosing longitudinally shiftable shifter rods having laterally offset superposed shifter forks, an operating shaft journalled in one side of said shifter rod housing and having one end projecting forwardly therefrom, remotely disposed actuating means comprising a lever universally supported intermediate its ends and having a direct yoke connection to said shaft whereby lateral rocking of the lever about its support results in rocking of said shaft in the same direction of rotation connected to said end of said shaft for effecting predetermined rotation and longitudinal movement thereof, an arm in said housing keyed to said shaft and extending transversely between said shaft and said forks for effecting selection and shifting of said rods upon said movement of said shaft, and resilient means carried by said arm and engageable with said housing walls for indicating opposed limiting rocking positions of said arm.

3. Gear shifting mechanism adapted to be mounted on a transmission housing comprising a shaft extending longitudinally along the top of said housing, a plurality of shift rods substantially in the same horizontal plane as said shaft, selecting means extending laterally from said shaft toward said rods, spring pressed plungers carried by said selecting means and respectively engageable with opposed abutments to indicate limiting positions thereof by the increased resistance due to engagement with said abutments, independent means disposed in superposed position in the path of rotative movement of the free end of said selecting means and connected to each of said rods whereby rotation of said shaft places said selecting means in selective engagement with each of said means, and means for shifting said shaft axially to impart longitudinal shifting movement to the selected shift rod.

4. In combination with a transmission having an open top, a flat housing secured on said top and having a plurality of coplanar parallel shift rails journalled therein for longitudinal movement, a portion of said housing laterally overhanging one side of said transmission, an operating shaft journalled in said overhanging portion parallel to and substantially coplanar with said rails, said shaft being arranged for selective rotative and longitudinal movement, an arm extending transversely from said shaft and movable therewith to effect selection and shifting of said rails, and oppositely directed resilient bumper means carried by said arm and engageable with said housing for indicating limiting rocking positions of said arm.

LEO A. BIXBY.